Nov. 10, 1970 W. GROTH ET AL 3,538,612
METHOD OF PRODUCING DRY PRODUCTS WHICH ARE READILY
DISSOLVED OR DISPERSED IN A LIQUID AND APPARATUS
FOR PERFORMING THE METHOD
Filed April 19, 1968

INVENTOR
Wilhelm GROTH,
PETER HUSSMANN
BY
ATTORNEY

United States Patent Office 3,538,612
Patented Nov. 10, 1970

3,538,612
METHOD OF PRODUCING DRY PRODUCTS WHICH ARE READILY DISSOLVED OR DISPERSED IN A LIQUID AND APPARATUS FOR PERFORMING THE METHOD
Wilhelm Groth, 38 Melbweg, 53 Bonn, Germany, and Peter Hussmann, Via Piana 10, Florence, Italy
Filed Apr. 19, 1968, Ser. No. 722,605
Claims priority, application Germany, Apr. 22, 1967, P 41,967; July 18, 1967, P 42,617; Italy, Dec. 12, 1967, 4,850A
Int. Cl. F26b 7/00
U.S. Cl. 34—11         31 Claims

ABSTRACT OF THE DISCLOSURE

The invention relates to the production of dried products which are quickly and easily dissolved in a liquid. The starting materials which may be food products, condiments and beverages, are liquids containing solids in solution or suspension, or pastes, slurries and the like and are applied as a plurality of superimposed thin permeable layers on a permeable porous carrier. Each layer is dried by passing a drying gas preferably from the layer side through the carrier until it can serve as a porous base for supporting the next succeeding layer, and after applying the final layer the material is dried in a final drying stage until the desired moisture content is achieved.

---

The invention relates to a method of producing dried products that are very easily and quickly dissolved or dispersed in a liquid, particularly food products, condiments and beverages which at the temperature of their treatment contain liquids and solids in the form of solutions, dispersions, pastes or the like.

In an earlier method which is described in Belgian patent specification No. 686,560 a product which is instantly soluble, particularly a dried powder, is obtained from starting materials containing liquids by placing the material that is to be dried on a stationary porous carrier and by passing a gaseous drying agent in upflow through the porous carrier and the material that is to be dried. When the starting material is a liquid a dispersed layer of the liquid forms first on the carrier and in the course of the continued passage therethrough of the drying gas this layer dries out completely. The product thus obtained has excellent and much better properties than comparable conventional products. In the further development of this method of drying occasional difficulties have been found to arise. For instance, the structure of the layer during the phase of solidification may sometimes develop in such an irregular way that it is difficult to get all parts of the mass on the carrier to dry out uniformly and evenly or at least this result cannot be achieved without the expenditure of additional effort and power. It has also been found that there are certain starting materials which are difficult by this prior art method to convert into a dispersed mass that will be completely and thoroughly permeated by the drying gas. Additional effort is then again needed to obtain the results the process is intended to achieve.

The present invention is based on fresh experience that has been gained in performing the process of drying a material containing a liquid in a porous layer on a porous carrier. The invention successfully deals with all those cases in which occasional difficulties have in the past been experienced. The proposed method also widens the field of application of the prior art method and leads to dried products that are even superior to those obtainable by the earlier method.

The proposed method of producing dry products which are readily dissolved or dispersed in a liquid from starting materials ranging from moist pulps to liquid by drying them with a gaseous drying medium, comprises depositing the starting material in a plurality of consecutive, thin, gas-permeable layers on a gas-permeable porous carrier, passing a stream of dry gas, preferably from the layer side, through the carrier and the layers of material deposited thereon, and so controlling the deposition of the layers of material that each deposited layer is allowed to dry at least sufficiently to serve as a porous base for supporting the next layer when this is deposited, and after deposition of the final layer drying the material in a final drying stage until the desired residual moisture content has been attained.

This method differs from the earlier method in several essential respects. One important feature of the novel method is the steady build-up of a bed of drying material that is thoroughly porous and permeable to the gas. This ensures that during the drying process the drying gas will uniformly reach every part of the drying material and that its drying effect will be as is desired. The porous bed is successfully built up because the liquid-containing material that is to be dried is exposed to the drying stream of gas and partly dried in thin consecutive layers which are gradually added one by one until the completed bed of material that is to be dried has the desired thickness. Each freshly deposited layer is predried until its mechanical strength is sufficient for it to function as a porous liquid absorbent base for the reception of the next layer of material that is then deposited thereon. The extraction of liquid which occurs during the process, and particularly the deposition layer by layer of the material that is to be dried, successfully prevents the layers of material from sticking together and from forming an impervious solid mass. The result of the procedure proposed by the present invention is therefore the creation of a bed consisting of a plurality of thin consecutive layers which cover the carrier like a very fine porous network which allows the drying gas to pass through.

Materials that are dried by the proposed method form pulverulent or coarse granular porous products that instantly dissolve or disperse in liquids to reconstitute the original solutions, suspensions or slurry-like masses, without any tendency of individual particles to stick together and to form lumps. Moreover, in the materials that have been dried as proposed, all the natural properties of the starting material are fully preserved. One major advantage of the proposed method primarily resides in that the aroma of the starting materials is substantially fully retained when the materials are dried by the method according to the present invention. This is probably due to the fact that aroma substances which may tend to volatilise are readsorbed by the inner layers of the material deposited on the support. With reference to the nature of the materials that are to be dried the applicability of the proposed method is practically universal. Solutions or dispersions with a solids content of about 1 to 90% as well as slurries and foams can be dried. The particular importance of the proposed method dies in its applicability to the drying of foods, comestibles and beverages, such as milk products, including milk itself, joghurt, fruit and fruit juices, such as bananas and orange juice, chopped vegetables, mashed potatoes, coffee, tea in solution as well as solutions of sugar, glucose and molasses. On the other hand, solutions or dispersions of chemicals can likewise be dried in the same way. In special cases liquids and dispersion may be dispersed by a gas prior to their deposition in layers on the porous carrier.

It is preferred to deposit the starting material that is to be dried in intermittent steps in the form of thin layers and partly to dry the same simultaneously and/or in the intervening periods, i.e. to perform the method in steps in such manner that the step of depositing a thin layer of the material that is to be dried is directly followed by a drying step for sufficiently solidifying the freshly deposited layer to enable it to bear the next layer. However, this procedure is not obligatory. If the material that is to be dried is deposited at a sufficiently slow rate the drying gas may be passed through the layers continuously and the process thus performed in one continuous operation. However, the first mentioned method of proceeding in consecutive steps of depositing layers and drying has numerous and considerable advantages. During the intermittent deposition of consecutive layers the stream of drying gas may likewise be intermittently or preferably continuously passed through the layers.

The deposition of the material that is to be dried on the carrier may be preformed in different ways, but allowance must be made for the fact that the predried material that has already been deposited on the carrier is compressed by the superimposition of further material. Consequently the material should be deposited without the exertion of any substantial pressure or of at least only a negligible amount of pressure. When a layer is deposited another point to remember is that the fresh layer must be sufficiently porous to permit the drying gas stream to penetrate the entire thickness of the bed.

The material that is to be dried may be applied to the carrier or to the predried previously deposited layers by spreading it over the same. Alternatively, rollers charged with the material that is to be dried may be used for this purpose, the roller surface being preferably covered with the material that is to be dried in the form of a fine netlike dispersion. However, the preferred method of depositing the layers consists in spraying the material that is to be dried onto the carrier. Nozzles may be used and these may be conveniently disposed 0.5 to 15 metres, preferably 2 to 5 metres above the porous carrier. Spraying ensures a uniform distribution and precise apportionment of the material that is to be deposited on the carrier.

In the performance of the proposed method the individual layers are so thin that there is never any risk of sticking and of the pore being blocked. The thickness of the individual layers must depend upon the physical properties of the starting material that is to be dried. Generally it should not exceed 1 mm. but the usual thickness of such a layer would be in the range of 20 to 500$\mu$, preferably 50 to 200$\mu$. The next layer should not be applied until the preceeding layer has had sufficient time to dry. The particles of the several layers form an agglomerate as they dry. Drying is therefore directly accompanied by the creation of "instant" properties due to agglomeration and porous granulation and at the end of the process a product results which has the form of granular bodies having instant solubility properties and which can be readily broken down into crumbs or pulverised. The structure of the particles obtained by the proposed method quite clearly differs from that of an expanded spray-dried powder as well as from that of a freeze-dried powder. The novel material is characterised by a particularly pronounced willingness to be taken up in water or to dissolve therein to the extent soluble components are present. Use is already made of this property during the actual process. In the intermittent method comprising alternate deposition and predrying steps the predried mass which is already present on the carrier acts like a layer of blotting paper on the damp mass applied in the next layer. It absorbs the moisture from the fresh layer and thus helps in bringing about a rapid mechanical solidfication of the fresh layer in the form of a porous structure. Whether a freshly applied layer has become sufficiently firm can be readily ascertained manually or by visual inspection. In the case of numerous materials the progress of solidification becomes apparent because the freshly formed surface then begins to "glitter." Adjustment of the individual steps of the method can thus be effected without any trouble. In the performance of the method of deposition and drying can be repeated until general considerations indicate the advisability of discontinuing the further build-up of layers. An example of a relevant factor is the permeability of the thickening bed to gas, which gradually diminishes until it ceares to be sufficient, there being a corresponding decline in the drying rate. It has been ascertained that the application of further layers can be continued until the total thickness of the bed of material is about 100 mm. However, this does not mean that this figure is the maximum possible. The normal final depth of the bed would be about 5 to 25 mm.

A preferred procedure also differs from the method described in the Belgian Specification in that in the present invention the stream of drying gas, at least for partial drying, is passed through the drying material from the side of the freshly applied damp layer. If the porous carrier is roughly horizontally disposed—an arrangement that will usually commend itself—the material that is to be dried can be applied in thin layers to the top of the carrier, particularly by spraying, and the stream of drying gas simultaneously passed through the material and the carrier parallel to the spray from above. This results in a drying effect which is particularly uniform throughout the bed of drying material, probably due to the fact that the deeper layers continue to be re-moistened by the additional material that is sprayed onto the surface and that the moisture is therefore evenly distributed throughout the depth of the bed. Another advantage of this method of conducting the process is that during the spraying phase fine particles of material are necessarily deposited on the carrier and that such fine particles cannot be entrained and carried into other parts of the apparatus since the lower layers of drying material in conjunction with the porous carrier have a filtering effect.

However, the continuous introduction of gas from the damp fresh layer side is not essential for every phase of the drying process and in another embodiment of the invention the direction of flow of the gas may be reversed. Reversed gas flow would be preferred for instance for final drying. Entrained particles of material can then be filtered out by subsequently passing the gas through another region of the bed from the fresh layer side. This has the further advantage that the fine particles of entrained material promote the generation of a porous granulate on the bed of drying material.

In the application of the proposed method in practice it has been found that a working cycle can be based on the performance of the consecutive steps of the method in rapid sequence. For example, the spraying phase may be continued for ½ to 1 minute to build up a layer that is about about 0.1 to 0.3 mm. thick which may then be dried in 2 to 3 minutes or less to the extent required for a fresh layer to be deposited. When a sufficient number of layers has been deposited further drying of the predried material can be continued in a final drying stage until the desired or necessary residual moisture content has been reached, and the material may then possibly be crushed.

In another preferred embodiment of the invention the material that is to be dried is applied to the carrier in a plurality of thin layers with simultaneous and/or intervening drying stages and then submitted to a more intense and/or prolonged intermediate drying treatment by a stream of dry gas before more fresh layers are applied to the bed. If such an intermediate drying treatment is performed the solubility of the final product will be particularly high. Moreover, when the intermittent procedure is adopted, comprising alternate steps in which the material is deposited and pre-dried, the interval between the deposition of consecutive layers can be curtailed because major quantities of moisture are abstracted from the layer of material in each intermediate drying step. This procedure also permits the process to be continued to greater depths of the bed. The stream or dry gas for the intermediate drying stage is preferably passed through the drying material and the porous carrier from the layer side. As already mentioned in connection with the predrying stage, the drying effect on the layers of material is then particularly uniform. The intermediate drying stage is preferably performed for a length of time which equals that required for depositing and predrying the several layers of material between two intermediate drying stages. This procedure is particularly suitable for a continuous performance of the proposed method. Preliminary and partial drying, possibly in conjunction with intermediate drying, may also be described as the 1st main drying stage, whereas the final or last drying stage may be described as the 2nd main drying stage.

The initiation of the process, i.e. the application of the first layer of material to the porous carrier can be assisted by a simple precaution which not only assures that the drying material will exhibit the desired textile-like granular structure but which will also prevent the material from sticking to the carrier. This consists in simply scattering a thin layer of the previously dried material on the uncharged porous carrier surface before the first layer of moist material is deposited.

With reference to other details of the proposed method reference may be made to the above mentioned publication of the earlier method upon which the present method is based. For instance, in the present method it is likewise preferred to use as a porous carrier material a woven, knitted or unwoven fabric consisting of monofils or multifils, preferably synthetic monofils or multifils. Examples of a suitable porous carrier material are sheet-like materials of any woven or knitted fabric consisting of synthetic monofilar or multifilar threads, such as polyethylene filaments or filaments of polystyrene, PVC, polyesters, polyamides or polyvinyl chloride. The several requirements the porous carrier should fulfill are thus optimally satisfied, namely satisfactory strength combined with sufficient porosity and permeability to gas. Particular importance attaches to the use of carrier materials made of multifils and particularly of monofils because they substantially prevent the carrier and the drying material from sticking together. Naturally this is a matter of considerable importance in performing a continuous large-scale industrial process. The rapid solidification, at least in thin layers, of the material that is to be dried, means that the pore size of the carrier is not critical. It is merely necessary to make sure that at the beginning of the process the carrier possesses sufficient bearing surface and adequate filtering effect for the material it is required to carry.

Conveniently the drying gas stream should have been dried at a high temperature. An inert gas, such as pure nitrogen or carbon dioxide, could be used, preferably having a moisture content as wol as 0.02 to 0.01 g./cu. m. corresponding to a dew point of −72 to −76° C. For materials which readily oxidise an inert gas should preferably be used of a purity, free from oxygen, of 99.9%. A suitable drying gas for a material that is not liable to oxidise is, a preferably very finely filtered, air. In the course of the process the inert gas is charged with moisture and then dehumidified by adsorbents.

In the proposed method a drying gas which has a relatively high moisture content may first be used during the build-up of the bed, a gas that has been dried at a high temperature being employed for completely drying out the finished bed, i.e. for the final drying step. The gas velocity will largely depend upon the choice of the other conditions under which the process is to be performed. By using elevated pressures the volume of gas that is passed through the drying layers can be increased. Naturally the proposed method calls for the provision of controls to ensure that the drying layers, particularly in the initial stages when the layers are in course of being built up, are not compressed to render them impervious. As a rule the proposed method will be performed at low pressure, say at a gas presure between 50 and 500 mm. water column.

The gas temperature will depend upon the sensitivity of the material that is to be dried. Generally this should be below 80° C. and preferably within the range from 5 to 50° C. For temperature-sensitive materials temperatures up to about 35° C. should be appropriate. The gas temperature may be different in the several stages of the process. For predrying a gas at a temperature between 10 and 60° C., preferably between 20 and 25° C., and having a relative humidity of not more than 30%, preferably between 2 and 30%, should be best. Owing to the high rate of evaporation of water in the predrying stage the temperature of the drying material will not as a rule reach that of the gas which is introduced at the same time. This applies more particularly when the gas is passed through the drying material and the carrier from the layer side of the bed. If the deposition of the layers and predrying are interrupted by an intermediate drying stage, then the latter is preferably performed with a dry gas at a temperature between 20 and 50° C., preferably between 25 and 30° C., haivng a relative humidity not exceeding 20%, preferably between 2 and 15%. For the final drying stage a gas should be used at a temperature of about 15 to 30° C. preferably between 18 and 20° C., having a relative humidity of 0.5 and at most 5%. In detail the temperatures and humdities of the drying gas would be selected by reference to the sensitivity of the material that is to be dried and the nature and duration of the several stages. Provided the other conditions are suitably matched the gas stream used for the final drying stage can be used again for preliminary drying, possibly after having been previously heated. If an intermediate drying stage is included the drying gas can first be used in the intermediate stage before being used for predrying.

The used drying gas which is charged with moisture can be dehumidified in the manner described in the abovementioned earlier patent. The same applies to any chemical processing of the drying gas. For dehumidifying an inert gas that has been used for drying silica gel, partly soaked with a monovalent copper chloride, may be used to advantage. The monovalent copper binds traces of oxygen which may have been introduced in the material that is to be dried. Regeneration can then be performed by the application of heat in the presence of hydrogen. The technical application of the proposed method naturallly makes it desirable that the process should be continuously performed. The intermittently performed process can be modified to work continuously without great difficulty. An example will be hereunder described:

The porous carrier has the form of an endless travelling band which may comprise an endless chain of interlinked screens. At least one device for applying the material that is to be dried, for instance in the form of a sprayer, is provided at one point above the travelling carrier. In other words, the spraying device does not extend over the entire length of the travelling carrier, but affects only a localised area of the band near the beginning of its path of travel. In practice the speed of travel of the endless carrier band or chain of screens is so adjusted in relation to the rate of deposition of the material that the last layer of material that has been applied will not arrive against under the sprayer until it has already consolidated sufficiently to permit the next layer to be sprayed onto the same. With the same effect the means for depositing the layers might be movably mounted above a stationary carrier or a carrier travelling at a much slower speed. In such an arrangement the means for depositing the layers might then be arranged to travel or to reciprocate whilst the drying gas is simultaneously passed through the carrier and the layers as these build up, or alternatively a series of sprayers provided along the length of the carrier could be sequentially turned on and off. If a sprayer is arranged to reciprocate it must be borne in mind that near the points of reversal the interval of time elapsing between the application of consecutive layers is shortened.

A reversal of the direction in which the drying air passes through the carrier and the deposited layers can be conveniently brought about by passing a traveling band or an endless chain of screens through consecutive chambers in which the direction of flow of the gas is different. For instance, in a first spraying chamber the material that is to be dried may be applied to a horizontal traveling carrier from above and a gas stream for consolidating and provisionally drying off the freshly sprayed layer on the porous carrier blown through the layer from above downwards, either simultaneously with the application of the layer or immediately after the layer has been applied, and preferably in the same chamber. This part of the traveling band or chain of screens then travels through one of more drying chambers in which the drying gas stream is conducted in the opposite direction so that the gas blows through the partly dried layer from below upwards. If desired, further reversals in the direction of flow of the gas can be provided by passing the traveling band or screens through further chambers before a fresh layer is applied when the carrier reenters the first chamber or another chamber fitted with a layer depositing means. Naturally the streams of drying gas flowing through different chambers can be so connected together that an optimum utilisation of the drying capacity of the gas results. For example, the gas stream may be conducted through the chambers in counterflow to the direction of travel of the endless carrier.

It will generally be advisable to detach the material from the porous carrier after it has been predried or intermediately dried and to submit the same to final drying, possibly in thicker layers, on a different gas permeable carrier, particularly on a perforated plate. This is desirable because, according to the material that is being dried, the depth of the bed of layers that can be built up on the porous carrier is subject to more or less definite limitations and, after having solidified, the material on the porous carrier yields a relatively small amount of moisture to the gas which therefore picks up very little. Moreover, final drying usually takes a much longer time to perform and it is therefore best to make the porous carrier available for a fresh build up of layers as quickly as possible. The layers must of course be detached carefully, since the finely porous material is still plastically deformable until it is completely dry, and any considerable deformation might adversely affect its solubility properties. If the porous carrier consists of a flexible material, such as a fabric, the predried material can be conveniently detached by considerably deforming the carrier, preferably in rapid alternation, and more particularly by stretching and slackening the same in rapid succession. Other advantageous possibilities are also available, and these will be referred to as the description proceeds.

A particularly useful and preferred procedure for performing the proposed method will first be described. However, it will be understood that the several features of this preferred embodiment may be used severally or jointly in other modifications of the proposed method.

*First stage* (Deposition and partial or preliminary drying of the material).—From a height of 1 to 15 metres, preferably between 2 and 5 metres, a liquid or paste-like product containing between 1 and 90% dry matter is sprayed from spraying nozzles in co-current with a predried gas which is at a temperature between about 20 and 25° C. and which has a relative humidity of about 10 to 20%, onto a screen-like carrier in very thin porous layers. When a layer of a thickness of about 50 to 500μ, as may be desired, has thus been deposited on the carrier, spraying of the material is discontinued whilst the gas stream is maintained until the moisture content of the layer has been reduced by about 20 to 40%, when a fresh layer is deposited in the same way.

*Second stage* (Intermediate drying).—When several layers have thus been deposited and predried the moisture content of the bed is further reduced by another 5 to 10% by using a gas that has been dehumidified to a relative humidity of between about 5 and 15% and that is at a temperature of about 20 to 30° C. or less. Stage 2 is continued for about the same period of time as that required to complete stage 1. The first and second stages are repeated in alternation until the layered bed on the carrier has reached a predetermined depth not exceeding a maximum of about 0.1 metres.

*Third stage* (Final drying).—The final drying of the product to the desired final moisture content is then performed with a gas that has been dehumidified at a higher temperature to a relative humidity of about 0.5 to 5%, the gas being introduced at a temperature between 8 and 20° C. Preferably the material obtained after the final intermediate drying stage is detached from the porous carrier and before being submitted to the final drying stage deposited on a special carrier such as a screen-like support or on spiked rollers in layers which may be about 4 metres thick. In this stage the drying gas is preferably passed through the drying material from the underside upwards. This direction of flow is particularly suitable for continuous drying because the material which is nearest the porous support is completely dried and removed although the upper layers of material are still moist. The drying time in this stage depends upon the drying properties of the material and may be as much as 100 hours and more if the treated material is hygroscopic.

The gradation of the gas humidities in the above described procedure may also be different. For instance, in the first stage it may be 15%, in the second stage 10% and in the third stage 2 to 5%. The process may also be carried out by using lower, similarly graduated temperatures. Each stage may comprise an independent temperature cycle. According to the nature of the drying material the gas temperature in the first and second stages may also be higher, say 60° C. More particularly, in the first stage the high rate of evaporation and the heat of evaporation prevent the product from reaching the same high temperature as the gas.

In preferred apparatus for performing the proposed method the porous carrier is linearly movable and/or tiltable about a horizontal axis and provided with means for detaching the predried material from the carrier. For the final drying of the material at least one screen is provided. A suitable means for detaching the material from the carrier may be formed by screen-like layers of fabric or plates which are raisable or deflectable and which cover the porous carrier, the size of the mesh of said covering layer exceeding the pore size of the carrier and preferably being in the range from about 1.5 to 10 mm. When the fabric covers are raised or swung off the carrier, the predried material is detached from the porous carrier. The material is easily removed from the fabric covers because owing to the coarse mesh of the fabric covers adhesion between the latter and the material is fairly weak. In order to take advantage of the possibility of deforming a flexible carrier the latter may be suspended between relatively movable frame members. By moving such frame members towards and away from each other the porous carrier is first stretched and then slackened and this action causes the material on the carrier to detach itself from the same. In some cases, particularly when prior to its detachment the material on the carrier faces downwards, the other side of the carrier may be arranged to cooperates with a vibrating means such as a grid capable of being vibrated. The vibrator raps the carrier and thus detaches the material. In such an arrangement it is also preferred to use a close mesh fabric as the carrier material. Generally speaking fabrics which have a mesh between about 0.005 and 1 mm. are preferred.

In a very useful form of final dryer an intermediate support is provided above a screen, said intermediate support being formed by a plurality of parallel spiked rollers, the spikes of neighbouring rollers being relatively offset and of such a length that the spikes interengage. When the rollers are rotated the material they carry is comminuted and at the same time deposited on the screen underneath.

In a simple apparatus for performing the proposed method a preferably cylindrical dryer contains a porous carrier consisting of a flexible material and tiltable about a horizontal axis, said carrier being supported by a system of strut-like frame members which are movable towards and away from each other. Below the carrier two screens are provided at different levels for final drying, the upper screen being conveniently provided with a vibrator, whereas the bottom screen is associated with conveyor means for carrying the dried material away. The space below the bottom screen communicates through a by-pass for powder with the space above the upper screen or above the porous carrier. Gas entry openings are provided below and possibly also above the bottom screen and gas exit openings above the porous carrier. In this arrangement the gas therefore always flows from below upwards. When the predried material is to be detached from the porous carrier and deposited on the screen, the porous carrier is turned upside down about its horizontal axis and the material is then detached by relaxing the carrier and abruptly stretching the same. The predried material then drops off in the form of relatively large lumps and is caught on the upper screen on which it gradually disintegrates as it continues to dry out, the fines falling through the screen onto the bottom screen, from which it is finally withdrawn. This trickling process is assisted by brief intermittent vibration of the upper screen. The mesh of the bottom screen is such that less desirable very fine material falls through this screen so that it can be collected, preferably by pneumatic means for return to the layer of material on the porous carrier or the upper screen.

In a particularly useful embodiment of apparatus for performing the proposed method, an endless band dryer travelling in two different levels is used, comprising porous carrier members such as screen trays which travel in a substantially horizontal position. A downwardly pointing nozzle for charging the material that is to be dried onto the lower level porous carriers is located between the two levels of the band dryer. The dryer is enclosed in a casing which above the upper level of the band contains gas entry openings and below the lower level of the band gas exit openings. Consequently, the drying gas will flow through both levels of the band through the porous carriers from the side carrying the drying material. The gas entry openings are preferably distributed along the entire length of the band.

At one of the returns of the band, conveniently at that return where the several porous carriers are conveyed from the upper to the lower level, a shaft-like final dryer may be provided. For transferring the material from the several porous carriers into the final dryer the porous carriers may be tiltably reversible above the final dryer at the return of the band. For detaching the material from the carrier a grid which raps the back of the carrier may be provided. The several porous carriers may also be provided with the above-mentioned open-mesh fabric covers which are deflectable above the final dryer by a lifting device provided above the final dryer.

In another embodiment a dryer casing contains an intermediate floor extending substantially over its entire cross section and possibly divided into segments, said floor being tiltable about a horizontal axis or each segment about its own axis. This intermediate floor comprises an air-permeable intermediate plate or plate segments and a porous carrier or carrier segments spaced above and below the intermediate plate. Above the intermediate floor is at least one sprayer nozzle pointing downwards. Below the intermediate floor is a final dryer comprising at least one screen. Gas entry openings are provided above the intermediate floor preferably above the nozzle or nozzles as well as below the bottom screen of the final dryer. Gas exit openings are provided between the two porous carriers and the intermediate plate of the intermediate floor. In this embodiment the drying gas flows through the porous carrier from the side carrying the material. In the final dryer the gas flows from below upwards.

Other features of the invention will be understood from the following particular description of two embodiments of drying apparatus according to the invention, shown in the accompanying drawings in which

FIG. 4 is a cross sectional view of the band dryer taken along lines IV—IV of FIG. 1.

Figure 1:
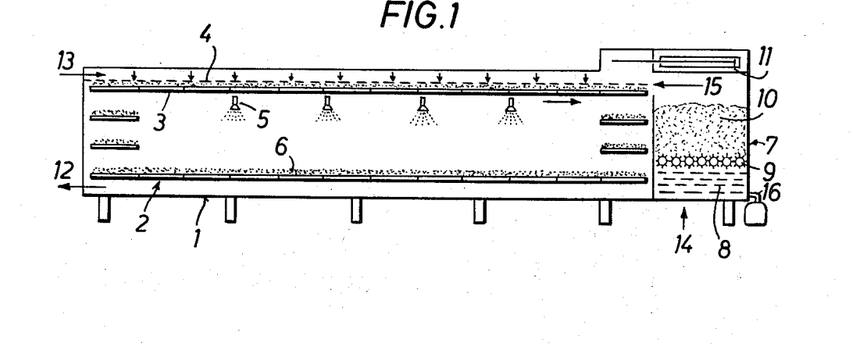
FIG. 1 is a longitudinal section of a band dryer.

Referring to the apparatus schematically illustrated in FIG. 1 there is provided in a tunnel-shaped casing 1 made of sheet iron or a synthetic plastics material, an endless conveyor 2 traveling in two horizontal planes and consisting of a plurality of screen trays 3 which serve as porous carriers and which retain their horizontal position as they travel around the endless conveyor path. The screens themselves consist of a fine-mesh synthetic fibre fabric. Above the upper level 2 of the conveyor a space is divided off by a perforated plate which ensures a uniform distribution of the drying air entering the top of the casing above the plate. Below the upper level of the conveyor are four nozzles 5 pointing downwards and appropriately spaced to ensure that the spray cones do not overlap and in fact leave gaps between them which are not reached by the sprayed material. The material 6 which is to be dried and which is sprayed from the nozzles is uniformly deposited on the porous carriers 3. At one end of the casing 1 a shaft-like final dryer 7 is located. The bottom of the final dryer 7 contains four vertically spaced screens 8, the one disposed above the other. Above the uppermost screen is an intermediate support 9 which is constituted by a plurality of interengaging spiked rollers. The spiked rollers support a coarsely particulate material 10 which is comminuted between the spiked rollers and then drops on the screens 8.

The porous carriers 3 are covered with open-mesh fabric covers not shown in the drawing. The upper part of the final dryer contains a receiving device 11 adapted to lift off the fabric covers. The receiving device and the fabric covers permit the material deposited on the porous carriers to be detached and transferred into the final dryer.

At the end of the casing 1 remote from the final dryer 1 a gas exit opening 12 is provided below the upper conveyor level and a gas entry opening 13 above the perforated plate 4. Another gas entry opening 14 is located below the final dryer 7 underneath the bottom screen 8. Near the receiving device 11 between the final dryer 7 and the part of the casing containing the conveyor 2 there is provided an opening 15 for the introduction therethrough of the predried material into the final dryer and for transferring the drying gas leaving the final dryer into the space at the top of the casing 1 above the perforated plate 4. Below the bottom screen 8 in the final dryer 7 an exit opening is provided for the discharge of the dried material, this opening communicating with a bagging device 16.

For the purpose of performing the drying process a gas stream is continuously introduced through the entry openings 13 and 14, the gas entering the final dryer 7 through the entry opening 14 having been dried at a high temperature and being introduced at about 18 to 20° C. This part of the gas stream constitutes only about 5 to 10% of the total volume of gas introduced. The gas which enters through the inlet opening at 13 is at a higher temperature, but has not been as intensely dried as that entering the final dryer. In that part of the casing which contains the conveyor the drying gas flows uniformly distributed over the entire cross section from above downwards. The nozzles 5 continuously spray the material that is to be dried to deposit the same on the lower level porous carriers 2. A layer that may be about 100μ thick is thus deposited on each individual carrier as it passes underneath the first nozzle. After having left the range of action of the spray cone of the first nozzle the material first traverses a zone in which no further material is deposited, and in which it is merely exposed to the effect of the drying gas. In this zone the freshly deposited layer dries off sufficiently to enable it to serve as a base for a layer of material that is now deposited thereon by the next nozzle. The operations of deposition and pre-drying alternate until the carrier reaches the conveyor return where the screen is raised, maintaining its horizontal position, to the upper level of the conveyor. Whilst travelling along the upper level conveyor path it is continuously traversed by the drying gas. This phase during which the carrier travels along the upper level path constitutes the intermediate drying phase. Upon reaching the return adjacent the final dryer 7 the carrier is again lowered to the bottom level where the deposition of fresh material and predrying phases alternate. The described process continues until the material that is to be dried has formed a bed that is about 2 to 10 cms. thick on the porous carriers. When this is the case the receiving device 11 grips the open mesh fabric covers on the porous carriers and swings them into the final dryer 7. The material detaches itself from the open mesh fabric and falls onto the spiked rollers forming the intermediate support 9. In the final dryer the material is then comminuted and dried until its residual moisture content is as dried.

If in the apparatus illustrated in FIG. 1 the length of the conveyor and the height of the final dryer are appropriately chosen to meet the demands of the throughput that is required, the gas streams may be passed consecutively through the several layers without the need of special partitions inside the dryer. For instance, if a gas which has been dried to a humidity of 5% is introduced at a temperature of 25° C. into the space in the casing above the perforated plate and then passes through the material resting on the upper level carriers, it will have attained a temperature of about 20° C. when entering the space between the two levels of the conveyor and its humidity will then be between 15 and 20%.

The dryer illustrated in FIGS. 2 and 3 has a cylindrical casing 21 which at the top contains a gas entry opening 22 and below this opening a perforated plate 23 for evenly distributing the entering gas. Below the perforated plate 23 is a nozzle 24 pointing downwards. This is a swirl nozzle. Roughly in the middle of the casing 21 is a circular intermediate floor 25 which extends over the entire cross section, and which is divided into a plurality of segments. The intermediate floor consists of segments 26 forming a plate. Above and below these segments in spaced relationship thereto are porous segmental carriers 27 and 28 in the form of fabric suspended in frames. Each of the several segments of the intermediate floor 25 can be turned upside-down about a horizontal axis 29. In the spaces intervening between the porous carriers 27 and 28 and the plate 26 the casing 1 is provided with gas exit openings 30 and 31, the exit opening 31 being situated between the plate 26 and the carrier 28 and connected to the gas entry opening 22 at the top of the casing. Below he intermediate floor 25 are three vertically spaced screens 32 which together constitute the final dryer. At least the uppermost of these screens 32 has the form of a lipped orifice plate and is associated with a vibrator. Occaional vibration promotes the disintegration of the material and the screening action. Below the bottom screen is a gas entry 33.

In this apparatus the gas continuously enters from below, passes through the three screens 32 and through the porous carrier 28 underneath the intermediate plate 26. The gas then flows through the openings 31 and 32 into the top of the casing, whence it passes through the perforated plate 23 downwards and through the porous carrier 27, finally to leave the apparatus at 30. The nozzle 24 intermittently sprays the material that is to be dried. As soon as the intermediate layered bed has built up to the desired depth the segments of the intermediate floor 25 are turned upside down. The central circular plate shown in FIG. 3 may be aranged to be turned together with one of the radial segments. The layers of material which now face downwards are then subjected to the intermediate drying stage and at the same time the other porous carrier which now faces the top is charged with intermittently sprayed fresh layers of material. As soon as the desired final depth has been attained the suspended porous fabric carriers 27 and 28 which are on the underside of the intermediate floor are slackened and abruptly retensioned. This causes the material to detach itself from the porous carrier and to drop onto the uppermost screen whence, after further disintegration and complete drying, it drops onto the screens underneath. The separation of the material from the porous carrier can be facilitated by first scattering pulverised dry material on the porous carrier before the first layer is deposited thereon by spraying. However, only a moderate amount of dry powder should thus be scattered, since otherwise the drying layer might already become detached during the process of intermediate drying.

As illustrated in FIGS. 1 and 4, in accordance with the invention, the detaching means include optionally movable screen-type fabric members 35, which have mesh openings larger than the pore size of the porous carrier. The fabric members are suspendable between frame members 36, which are relatively movable to effect their slackening and tensioning.

The detaching means may include a vibrator 37, such as a vibratable grid, which is located adjacent the side of the porous carrier remote from the material deposited.

The screen trays 3, which serve as the porous carriers are formed as endless belts and guided by and over guiderolls 34. Means are provided to maintain them in a swinging state in a horizontal position.

The scope of the invention is not intended to be limited to the use of the two embodiments of drying apparatus and to the particular manner of performing the process that have been above described. Both may be modified in diverse ways without departing from the essense of the invention. In the embodiment described with reference to FIG. 1 the nozzles are so located that at the level of the carriers a gap remains between two neighbouring spray cones. Nevertheless, the nozzles may be so located that neighbouring spray cones just touch. If in such an arrangement the nozzles were to be kept spraying continuously, possibly at a reduced rate of throughput, then the predrying or partial drying phase would proceed simultaneously with the process of spraying. The phase of exclusively predrying or partially drying the layers between two spraying cycles would be absent. However, the nozzles may also be arranged to spray intermittently, so that a predrying or partial drying phase can intervene between two consecurtive spraying cycles. In either case the intermediate drying stage is performed on the carriers at the upper conveyor level, as has been described.

The method adopted in apparatus of the kind described with reference to FIG. 2 also permits of modification. Again the nozzle may be arranged to spray continuously so that the spraying and preliminary drying proceed simultaneously, a purely predrying phase in the interval between two phases of spraying being absent. However, the preferred procedures are as described by reference to the two illustrated embodiments of apparatus according to the invention.

Factors which admit of general variations are the surface areas of the porous carriers, the total gas volume, the gas temperature, the degree of dehumidification of the gas, the gas permeability of the porous carrier, for instance the mesh of the fabric used as a carrier material, the output of the spraying nozzles and in the case of the travelling band type of apparatus the speed of travel of the band. By suitably relating these variables optimum drying conditions for any type of starting material can be established.

The following examples which relate to the drying of foods and beverages illustrate the broad range of purposes to which the invention can be applied.

Example 1—Creamed potatoes

A relatively dry mash of boiled potatoes with an adequate addition of milk and spices is sprayed onto a screen tray in a drying chamber through which dry nitrogen is passed in downflow. The screen itself is a cloth woven from polyethylene monofils and is first given a thin dusting with a dry potato product. In one procedural stage a layer which is 0.3 mm. thick is deposited on the screen tray by the spraying nozzle. The spraying process takes barely a minute to complete. The feeder is then inactivated and the dry nitrogen is passed through the screen tray from the top downwards for 3 minutes. The next layer of potato mash is then applied, again to a depth of 0.3 mm. This process is repeated until the total depth of the layered bed is about 20 mm. The product is then further dried for 20 minutes by passing a stream of dry nitrogen through the bed from below upwards. The layers are finally removed from the polyethylene cloth. Disintegration leads to a crumbly product which is taken up by cold water in a matter of seconds to reconstitute a potato mash which is fully equal to a freshly prepared product.

The following Examples 2 to 10 illustrate the drying process that has been described with reference to the continuously working travelling band type dryer shown in FIG. 1.

Example 2—Coffee 400 kg. per hour of coffee extract containing 50% dry matter are sprayed by two atomising swirl nozzles generating a droplet size of about 20 to 30µ onto the porous carrier which continuously travels under the nozzles, the coffee extract being thus deposited in a large number of thin porous layers which build up at a rate of about 1.2 to 2 mm. per hour. The distance between the nozzles is so chosen that the surface of the carriers between two spray cones on the lower level conveyor path is roughly equal to the surface of the porous carrier intersecting the spray cone. If it is desired to produce a coffee powder of lighter colour the coffee extract may be dispersed by an inert gas before it is sprayed, or a nozzle may be employed which draws in an inert gas and thus disperses the gas in the coffee extract. If no particular importance attaches to the colour of the coffee and a heavier bulk weight is not an objection, the extract may be sprayed without prior dispersion.

50,000 cu. metres per hour of inert gas, having a residual humidity of between 2 and 10% and entering at a temperature of 26° C., are continuously conducted from above downwards through the upper and lower level conveyor paths. By evaporation cooling the temperature of the gas is reduced to about 18.5° C. and it takes up about 4 grams of water per cu. metre.

After having been intermediately dried in the upper level conveyor path the moisture content of the finely porous layer of coffee on the porous carrier is about 8 to 10%. By spraying on fresh coffee extract this moisture content rises again to between 15 and 20%. During the period of partial drying between two periods of spraying the moisture content is lowered to about 10 to 15%. The absorptive power of the finely porous coffee layer in conjunction with the dry gas flowing downwards through the layer ensures that the distribution of moisture throughout the layer remains substantially uniform.

At the end of about 5 to 10 hours the total depth of the accumulated layers is about 10 cms. Following a period of intermediate drying the material is then transferred to the final dryer in which it forms a layer of a depth of one metre or more. Without interruption of the process fresh coffee extract is then sprayed on the porous carrier from which the previous bed of material has been removed.

The same inert gas, though a far smaller volume, is passed through the final drier from the bottom in upflow. This gas has a humidity of 0.5 to 2% corresponding to a dew point of −80° to −40° C. The temperature of this gas is between 18 and 20° C. The gas leaving the final dryer is then combined with the main volume of gas above the upper conveyor level. In other words, in the final dryer the material is dried in countercurrent and it remains in this dryer until its moisture content has been reduced to about 3%. This requires about 8 to 10 hours to accomplish. In the final dryer the material is at the same time disintegrated to the desired grain size and screened. The dried coffee extract leaving the final dryer is then packed under an inert gas atmosphere.

Excessively fine coffee powder produced during disintegration is returned by a fan to the lower or upper conveyor level. On the lower level the fine powder may serve as a dusting agent before the first deposit is sprayed on the porous carrier, but in the drying of coffee extract this is not usually necessary. The ultrafine dust may be deposited on the upper level carriers by the gas stream and it will there assist the process of drying and the process of granulation.

The instant solubility of the coffee powder thus obtained is at least equal to that obtained by freeze drying. The coffee powder has a very high content of aroma substances since these are not lost in the process according to the invention and need not be recovered.

Figure 2:
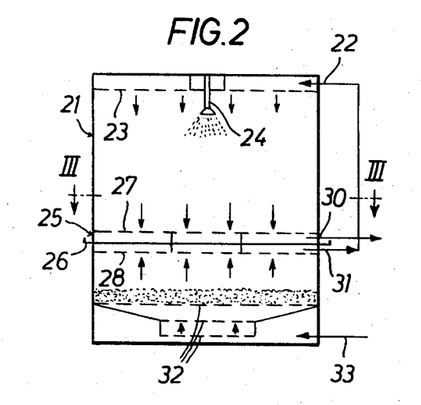
FIG. 2 is a section of a different dryer and FIG. 3 is a cross section of the dryer in FIG. 2 taken on the line III—III in FIG. 2.
Figure 3:
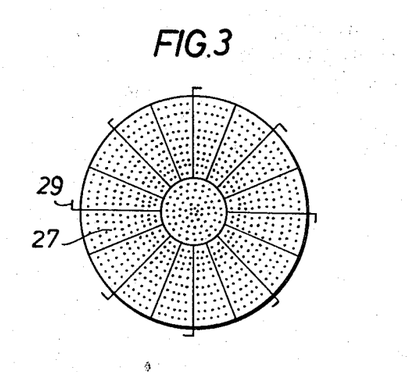

Without any substantial modification of the processing conditions the above described method of drying can also be performed in a dryer of the kind illustrated in FIGS. 2 and 3.

Example 3—Tea

In analogous manner to that described in Example 2 250 kg. of tea extract per hour containing between 10 and 20% of dry matter are sprayed. Since the tea extract, owing to its lower content of dry matter, contains about the same quantity of water as the 400 kg. of coffee extract described in Example 2, about 50,000 cu. m. per hour of dehumidified inert gas are again used for drying the tea extract. The extract is intensively dispersed with inert gas before being sprayed in order to obtain a tea powder of low bulk weight which facilitates using the correct dosages when subsequently preparing the tea. Despite its low bulk weight the depth of the layer on the porous carrier is less than that of coffee because of the smaller amount of dry substance the tea extract contains. The residence time or the team material in the final dryer is likewise about 8 to 10 hours.

Example 4—Bananas 270 kg. of banana pulp having a dry matter content of 25% are sprayed per hour. Although this material is more hygroscopic than coffee and tea, drying is promoted by its high content of cellulose. However, the required residence time of the banana material in the final dryer is substantially longer than that of coffee and tea, and may be between 48 and 60 hours. The ultrafine material obtained from the screens of the final dryer is dusted onto the lower level porous carriers as a powder underlay before spraying begins.

Example 5—Apple purée

Even in the case of an apple purée sweetened with sugar an evaporation rate of 200 litres of water per hour can be achieved under the same conditions as in Example 1, despite the very pronounced hygroscopic properties of the product. Hence 245 kg. of apple purée containing 18% dry matter are sprayed per hour. The residence time in the final dryer is about 24 hours. It is advisable to dust the porous carrier with the powder product before spraying begins.

Example 6—Orange, lemon and citrus fruit concentrates

Since these products are extremely hygroscopic, the evaporation rate of water in their case is less than in Example 1 under the same operating conditions and amounts to not more than about 100 litres per hour. Since the inert gas can take up the same quantity of moisture per cu. metre, only 25,000 to 30,000 cu. metres of inert gas are passed through the two levels per hour. 150 kg. of orange juice concentrate containing 12% dry matter, 108 kg. of lemon juice concentrate containing 8% dry matter or 260 kg. of citrus fruit concentrate containing 60% dry matter are sprayer per hour. It is advisable to dust with powder before spraying begins. The final drying takes about 120 hours or even longer. The fruit juice powders are very rapidly soluble and provide a fruit juice of natural flavour.

Example 7—Creamed potatoes

In the case of creamed potatoes the evaporation rate per hour under otherwise like conditions is substantially higher than in Example 1. About 400 litres of water can be evaporated per hour. Consequently a large volume of inert gas is passed through the two levels per hour. Since in the case of mashed potatoes the inert gas will take up 5 to 6 g. per cu. m. per hour about 80,000 to 90,000 cu. m. of inert gas are sent through the apparatus per hour. 500 kg. of a potato mash with a dry matter content of 18% and with an addition of milk are sprayed per hour. The residence time in the final dryer is about 5 to 6 hours. Dusting with the powdered product prior to spraying is unnecessary.

Example 8—Spinach

When drying a spinach purée the conditions are similar to those applying to a potato mash. 432 kg. of spinach purée containing 7.5% dry matter are sprayer per hour. Prior dusting of the carrier is unnecessary.

Example 9—Concentrated whole milk or skimmed milk

In the case of these products the conditions resemble those obtaining in the case of coffee and tea. 340 kg. of whole milk concentrate containing 40% dry matter or 524 kg. of skimmed milk concentrate containing 60% dry matter are sprayed per hour. The final drying process can be completed in as little as 2 hours. Dusting of the porous carrier prior to the first spraying is advisable.

In the same manner as coffee and tea extracts, hop extracts can also be prepared. Powders obtained from such extracts are valuable starting materials for brewing beer.

Example 10—Pectin-sugar mixtures

A pectin extract containing 60% dry matter, sugar and about 1.2% of highly esterified pectin (methoxy content 9 to 12% related to galacturonic acid) is sprayed and dried in the same way as described in the previous examples. An instantly soluble pectin-sugar mixture is thus obtained. In this case dry air can be used for drying.

If the sugar content of the dry pectin is insufficient for its subsequent use, for instance for making marmalade, a suitable quantity of ordinary sugar can be added to the dry pectin prior to packing. The pectin-sugar mixtures obtained in this example are far superior to the conventional gelatinising sugars based on moderately esterified pectin.

Other examples of foodstuffs which can be dried with advantage are whole eggs, egg yolks and egg whites.

We claim:

1. The method of producing dry products which are readily dissolved or dispersed in a liquid from starting materials ranging from moist pulps to liquids by drying them with a gaseous drying medium comprising the steps of:

(1) spraying said starting material in intermittent spray-durations onto a gas-permeable porous carrier in a plurality of consecutive, thin, gas-permeable layers, (2) in each interval between said intermittent spray-durations partially drying the layer just deposited by a first drying means to form a partially solidified porous base for supporting the next layer to be applied, (3) transferring said plurality of layers to a final drying stage, and (4) drying said plurality of layers in said final drying stage by final drying means until a predetermined moisture content of said plurality of layers has been attained.

2. The method according to claim 1, in which the porous carrier extends substantially horizontally and the starting material is sprayed from above.

3. The method according to claim 1, each of said layers not exceeding 1 mm. in thickness.

4. The method according to claim 3, said layers being between about 20 and about 500$\mu$ thick.

5. The method according to claim 3, in which consecutive layers are superimposed in accordance with steps (1) and (2) until the drying rate or the gas-permeability of the built-up layers has diminished to a predetermined level, the totality of said plurality of layers applied being built up to a thickness of up to 0.2 metres.

6. The method according to claim 5, said thickness being between 0.005 and 0.1 metres.

7. The method according to claim 1, in which the porous carrier is a textile web.

8. The method according to claim 7, said textile web being a monofil web of synthetic fibers.

9. The method according to claim 1, further comprising as a preliminary step preceding step (1) coating the porous carrier with a thin, previously dried, powdered layer of the starting material.

10. The method according to claim 1, said first drying means being a gas at a temperature of about 10 to 60° C., and having a relative humidity of not more than 30%.

11. The method of claim 10, said temperature being between about 20 and 25° C., and said humidity being up to 20%.

12. The method of producing dry products which are readily dissolved or dispersed in a liquid from starting materials ranging from moist pulps to liquids by drying them with a gaseous drying medium comprising the steps of:

(1) spraying said starting material in intermittent spray-durations onto a gas-permeable porous carrier in a plurality of consecutive, thin, gas-permeable layers, (2) in each interval between said intermittent spray-durations partially drying the layer just deposited by a first drying means to form a partially solidified porous base for supporting the next layer to be applied, (3) transferring said plurality of layers to an intermediate drying stage, (4) subjecting said plurality of layers to an intensive drying in said intermediate drying stage having intermediate drying means, (5) transferring said plurality of layers to a final drying stage, and (6) drying said plurality of layers in said final drying stage by final drying means until a predetermined moisture content of said plurality of layers has been attained.

13. The method according to claim 1, said final drying means being a gas at a temperature of about 15 to 30° C., and having a relative humidity of 0.5 to not more than about 5%.

14. The method according to claim 13, said temperature being between 18 and 20° C.

15. The method according to claim 1, in which said final drying means is a dry gas, said gas leaving the final drying stage and being re-used for said first drying means.

16. The method according to claim 15, wherein said gas is reheated before use as said first drying means.

17. The method according to claim 1, said final drying means being a dry gas, said gas being passed through said plurality of layers from the side of the porous carrier.

18. The method according to claim 12, said intermediate drying means being a dry gas at a temperature of 20 to 50° C., and having a relative humidity of not more than 20%.

19. The method as claimed in claim 18, said temperature being between 25 and 30° C., and said humidity being between 2 and 15%.

20. The method according to claim 12, said final drying means being a dry gas, said gas being led from said final drying stages for use as said intermediate drying means, said gas being led from said intermediate drying stage thereafter for use as said first drying means.

21. Apparatus for producing dry products which are readily dissolved or dispersed in a liquid from starting materials ranging from moist pulps to liquids by drying them with a gaseous drying medium, including an endless travelling band extending along two vertically separated paths, individual porous carriers supported on said band such that during their travel they remain substantially in a horizontal position, at least one spray nozzle arranged to deposit material to be dried on the porous carriers travelling along the lower path, a casing enclosing said endless band, said casing having gas entry openings arranged above the level of the upper path of said endless band and gas exit openings arranged below the level of the lower path of said endless band, detaching means for removing partly dried material from the carrier to a final drying stage and at least one perforated screen for supporting the partly dried material for finish drying in said final drying stage.

22. Apparatus according to claim 21, in which the porous carrier is a close mesh fabric, preferably having a mesh opening of about 0.005 to 1 mm.

23. Apparatus according to claim 21, in which the final drying stage includes an intermediate support arranged above the screen, said intermediate support consisting of relatively spaced spiked rollers, wherein the spikes of neighbouring rollers are relatively offset and long enough to interengage.

24. Apparatus according to claim 21, in which the gas entry openings are distributed substantially over the entire cross section of the casing.

25. Apparatus according to claim 21, including a shaft-like final dryer positioned at one return point of said endless band, preferably at the return over which the said porous carriers move from the upper level to the lower level of said band.

26. Apparatus according to claim 21, comprising a casing having an intermediate floor which substantially fills the entire cross section, said floor being divided into segments each tiltable about a horizontal axis, each said segment having a porous carrier disposed on either side and spaced therefrom, at least one downwardly pointing nozzle arranged above said intermediate floor for spraying material thereon, a final dryer stage arranged below the intermediate floor and containing at least one screen, said casing having gas entry openings provided above the intermediate floor, preferably above the said nozzle and below the said screen, and gas outlet openings provided between each of the porous carriers and the segments of the intermediate floor.

27. The method of producing dry products which are readily dissolved or dispersed in a liquid from starting materials ranging from moist pulps to liquids by drying them with a gaseous drying medium comprising the steps of:

(1) spraying said starting material in intermittent spray-durations onto a gas-permeable porous carrier in a plurality of consecutive, thin, gas-permeable layers, (2) partially drying said plurality of layers with drying means, simultaneously with step (1) and continuously, to form a partially solidified porous base for supporting successive ones of said plurality of layers, (3) transferring said plurality of layers to an intermediate drying stage, (4) subjecting said plurality of layers to an intensive drying in said intermediate drying stage, (5) transferring said pluarity of layers to a final drying stage, and (6) drying said plurality of consecutive layers in said final drying stage until a predetermined moisture content of said plurality of layers has been attained.

28. The method of producing dry products which are readily dissolved or dispersed in a liquid from starting materials ranging from moist pulps to liquids by drying them with a gaseous drying medium comprising the steps of:

(1) continuously spraying said starting material onto a gas-permeable porous carrier in a plurality of consecutive, thin gas-permeable lawers, (2) partially drying said plurality of layers with drying means, simultaneously with step (1) and continuously, to form a partially solidified porous base for supporting successive ones of said plurality of layers, (3) transferring said plurality of layers to an intermediate drying stage, (4) subjecting said plurality of layers to an intensive drying in said intermediate drying stage, (5) transferring said plurality of layers to a final drying stage, and (6) drying said plurality of layers in said final drying stage until a predetermined moisture content of said plurality of layers has been attained.

29. The method of producing dry products which are readily dissolved or dispersed in a liquid from starting materials ranging from moist pulps to liquids by drying them with a gaseous drying medium comprising the steps of:

(1) spraying said starting material in intermittent spray-durations onto a first gas-permeable porous carrier in a plurality of consecutive, thin, gas-permeable layer, (2) in each interval between intermittent spray-durations partially drying the layer just deposited by a first drying means to form a partially solidified porous base for supporting the next layer to be applied, (3) transferring said plurality of layers to an intermediate drying stage, (4) subjecting said plurality of layers to an intensive drying in said intermediate drying stage having intermediate drying means, (5) detaching said plurality of layers from said first porous carrier, (6) arranging the detached said plurality of layers on a second porous gas-permeable carrier in a final drying stage, and (7) drying said plurality of lawers on said second carrier in said final drying stage by final drying means until a predetermined moisture content of said plurality of layers has been attained.

30. The method of producing dry products which are readily dissolved or dispersed in a liquid from starting materials ranging from moist pulps to liquids by drying them with a gaseous drying medium comprising the steps of:

(1) spraying said starting material onto a gas-permeable porous carrier in a first, thin gas-permeable layer, (2) partially drying said first layer with gaseous drying means to form a partially solidified porous base for supporting a second spray-deposited layer,
(3) spraying said starting material on top of said first layer in a second layer, and
(4) transferring the layers resulting from step (3) to a final drying stage, and
(5) drying said layers in said final drying stage until a predetermined moisture content of said layers has been attained.

31. The method of claim 30 wherein steps (1), (2) and (3) form a repetitive cycle in which the resulting second layer of step (3) forms a base for successive layers intermittently spray-deposited after drying of each preceding layer according to step (2).

References Cited

UNITED STATES PATENTS

| | | | |
|---|---|---|---|
| 2,762,321 | 9/1956 | Cook | 34—208 XR |
| 2,969,111 | 1/1961 | Bocognano | 159—18 XR |
| 3,263,337 | 8/1966 | Sjogren | 99—207 XR |
| 3,415,665 | 12/1968 | Hussmann | 99—207 XR |

KENNETH W. SPRAGUE, Primary Examiner

U.S. Cl. X.R.

34—28, 208, 217